(12) United States Patent
Dauerer et al.

(10) Patent No.: US 6,311,177 B1
(45) Date of Patent: Oct. 30, 2001

(54) ACCESSING DATABASES WHEN VIEWING TEXT ON THE WEB

(75) Inventors: Norman J. Dauerer, Hopewell Junction; Edward E. Kelley, Wappingers Falls, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/250,310

(22) Filed: Feb. 16, 1999

(51) Int. Cl.[7] .................................................. G06F 17/00
(52) U.S. Cl. ........................ 707/2; 707/3; 707/4; 707/5; 345/733; 345/759; 345/835; 345/810; 345/146; 345/968
(58) Field of Search .................... 707/2, 1–10; 345/156, 345/157, 339, 329–332, 348–354, 145–146, 968

(56) References Cited

U.S. PATENT DOCUMENTS

| | | | |
|---|---|---|---|
| 5,794,232 | * | 8/1998 | Mahlum et al. ........................ 707/3 |
| 5,913,209 | * | 6/1999 | Millett ..................................... 707/3 |
| 6,003,032 | * | 12/1999 | Bunney et al. ....................... 707/10 |
| 6,018,345 | * | 1/2000 | Berstis ................................. 345/357 |
| 6,061,700 | * | 5/2000 | Brobst et al. ........................ 707/517 |
| 6,092,074 | * | 7/2000 | Rodkin et al. ...................... 707/102 |
| 6,104,380 | * | 8/2000 | Stork et al. ......................... 345/158 |
| 6,112,202 | * | 8/2000 | Kleinberg .............................. 707/5 |
| 6,112,209 | * | 8/2000 | Gusack .............................. 707/101 |

OTHER PUBLICATIONS

Mark R. Brown, using netscape 2, 1995.*

* cited by examiner

*Primary Examiner*—John Breene
*Assistant Examiner*—Debbie Le
(74) *Attorney, Agent, or Firm*—Steven Capella

(57) ABSTRACT

Access to ancillary database information is provided to enhance the viewing of a Web page while minimizing page clutter using processes and systems which determine links between ancillary databases and parsed Web page text, indicate the existence of links to the viewer, and provide access to the database information on viewer demand. The processes and systems may be used to access information in a plurality of ancillary databases. Preferred ancillary databases are dictionaries.

19 Claims, 4 Drawing Sheets

ACCESSING DATABASES WHEN VIEWING TEXT ON THE WEB

BACKGROUND OF THE INVENTION

The proliferation of the World Wide Web as a means of communication has enabled individual persons to access information from a wide variety of sources simply by clicking on a hypertext link or by typing in a URL address to view a page (or pages) of visual or textual information.

In recent years, the trend has been to increase the functionality and visual impact of pages or sites accessed by the World Wide Web. Such enhancements are enabled by increased power of the programming languages such as HTML and Java which drive Web pages and Web browsers. These continual improvements to Web programs and media have provided increased benefits to the user accessing the Web as well as the publisher of the information on the World Wide Web.

While the Web provides individual users to access a multitude of Web sites at the individual user's choice, the Web does not provide the user with assistance in dealing with web page text that does not contain hypertext links. In this regard, the user is generally left at the mercy of the Web page designer and the skill level for which the Web page was designed. Where the Web page content is unclear or is outside the viewer's area of expertise, the user may not be able to obtain the full benefit of the content. For example, the user's comprehension of the page may be enhanced by viewing a definition of a word used in the Web page or by viewing some other data which enhances the benefit obtained from the page content.

While there is a desire to enhance the ability of users to comprehend and derive benefit from the content of an accessed Web page, the ability to add additional information directly to the Web page may be problematic. For example, the Web page may already be cluttered with various graphics. Any addition of functionality to assist the user may cause further page clutter discouraging the user from putting forth the effort to parse the page for content. Addition of functionality which alters the appearance of the Web page to the user may also present legal issues relative to the rights of the Web page author.

Thus, there is a need for tools to enhance the ability of the user to comprehend and derive benefit from the content of the Web page while not detracting from the appearance of the Web page.

SUMMARY OF THE INVENTION

The invention provides processes and systems which enable access to ancillary database information to enhance the viewing of a Web page while minimizing page clutter, especially for Web page text that is not hyperlinked. The invention provides the end user viewing the Web page with the ability to access directories or databases by pointing to text supplied by the Web page designer. The processes and systems of the invention indicate (preferably by change of pointer shape or other appearance attribute) the availability of an information retrieval function to the user where a screen pointer is over text data. The processes and systems of the invention determine the existence of links between ancillary databases and parsed Web page text at the pointer position, indicate the existence of links and provide viewer access to the database information.

In one aspect, the invention encompasses a method for accessing data from a database file at a client computer in response to information viewed on the client computer from an intranet or internet source, the method comprising:

a) on a client computer screen, accessing a source page from an internet or intranet server, b) pointing to a screen position on the accessed page using a pointer means, the pointer means being capable of changing appearance mode on the client computer screen, c) parsing the accessed page at the pointer position to determine whether the pointer is over a link location and whether the pointer position is over text data or unlinked white space, d) altering the appearance mode of the pointer means in response to the determination of step c), where the pointer is determined to be over text data in step c), the pointer means indicating the availability of a data retrieval function, e) receiving input requesting activation of the data retrieval function, f) providing at least one database in a computer readable storage device, the database(s) containing (i) at least one string-searchable field or (ii) at least one string index file linking text strings to information contained in the database, g) in response to the input of step e), parsing the text data to determine a parsed text value, comparing the parsed text value to values contained in the database(s) to determine the existence of relevant information in the database(s), and h) communicating on the client computer information selected from the group consisting of (i) a menu of selectable available relevant information selections from the database(s) determined in step g), (ii) relevant information from the database(s), or (iii) a combination of (i) and (ii).

The appearance modes of the pointer means preferably differ in shape. Where the information retrieval function of the invention can be invoked, shape preferably is suggestive of an information retrieval function. In an alternative embodiment of the invention, the availability of the information retrieval function may be indicated by an alteration of appearance in the frame of the Web browser as displayed on the client computer.

In an alternative embodiment, the application of the invention can be limited to unlinked text only. In such instance, the determination in step c) of whether the pointer was over text or white space would be avoided in linked areas and the default browser behavior for hypertext links would hold.

In further alternative embodiment, the indication of the availability of the information retrieval function can be performed after comparing the parsed text value with the database or index file information. In this embodiment, the availability of the information retrieval function would be indicated only if there were actual relevant information available in the database(s).

The methods of the invention may be carried out on one or more computing devices in addition to a client computer. Thus, the comparison operation(s) or other steps of the method may be performed on a server computer(s) which communicates the results to the user through the client computer.

The invention further encompasses systems for carrying out the methods of the invention for accessing data from a database file at a client computer in response to information viewed on the client computer from an intranet or internet source, the system comprising:

a) a client computer having (i) a view screen, (ii) a pointer means, the pointer means being capable of changing appearance mode on the client computer view screen, and means for displaying Web pages on the view screen, b) a source of internet Web pages, intranet Web pages, or both, the source being accessible by the client computer, c) a first parsing means for parsing a Web page displayed on the view screen at a pointer position on the screen to determine whether the pointer position is over a link location and whether the pointer is over white space or text data, d) means for altering the appearance mode of the pointer where the pointer is determined to be over text data in step c), the pointer means indicating the availability of a data retrieval function, e) means for receiving input requesting activation of the data retrieval function, f) a computer-readable storage device containing at least one database, the database(s) containing (i) at least one string-searchable field or (ii) at least one string index file linking text strings to information contained in an information file of the database, g) a second parsing means for parsing text data in a Web page on the view screen to determine a parsed text value, h) means for comparing the parsed text value from the second parsing means to values contained in the database(s) to determine the existence of relevant information in the database(s), and i) means for generating the relevant information from the database(s) and communicating on the client computer information selected from the group consisting of (i) a menu of selectable available relevant information selections from the database(s) based on output from the comparing means, (ii) relevant information from the database(s), or (iii) a combination of (i) and (ii).

The means of the systems of the invention are preferably embodied in programmed computers. The system may comprise a plurality of databases stored on computer-readable media. The system may further comprise a server computer wherein the computer-readable storage device is readable by the server computer. The comparing means may located on a server computer.

Alternatively, the means for altering the appearance of the pointer may be actuated by the result of the determination from the second parsing means. The second parsing means may be actuated by user input or by the result of the determination from the first parsing means. A means for altering the appearance of the viewer (browser) may be substituted for the pointer alteration means.

The database(s) used in the methods and systems of the invention is preferably a dictionary, thesaurus, catalog or other information source.

The invention also encompasses computer-readable media for carrying out the methods of the invention wherein the computer-readable media contains information and/or programming which can be read and acted on by one or more computers to carry out the methods of the invention.

These and other aspects of the invention are described in further detail below.

DETAILED DESCRIPTION OF THE INVENTION

Figure 1:
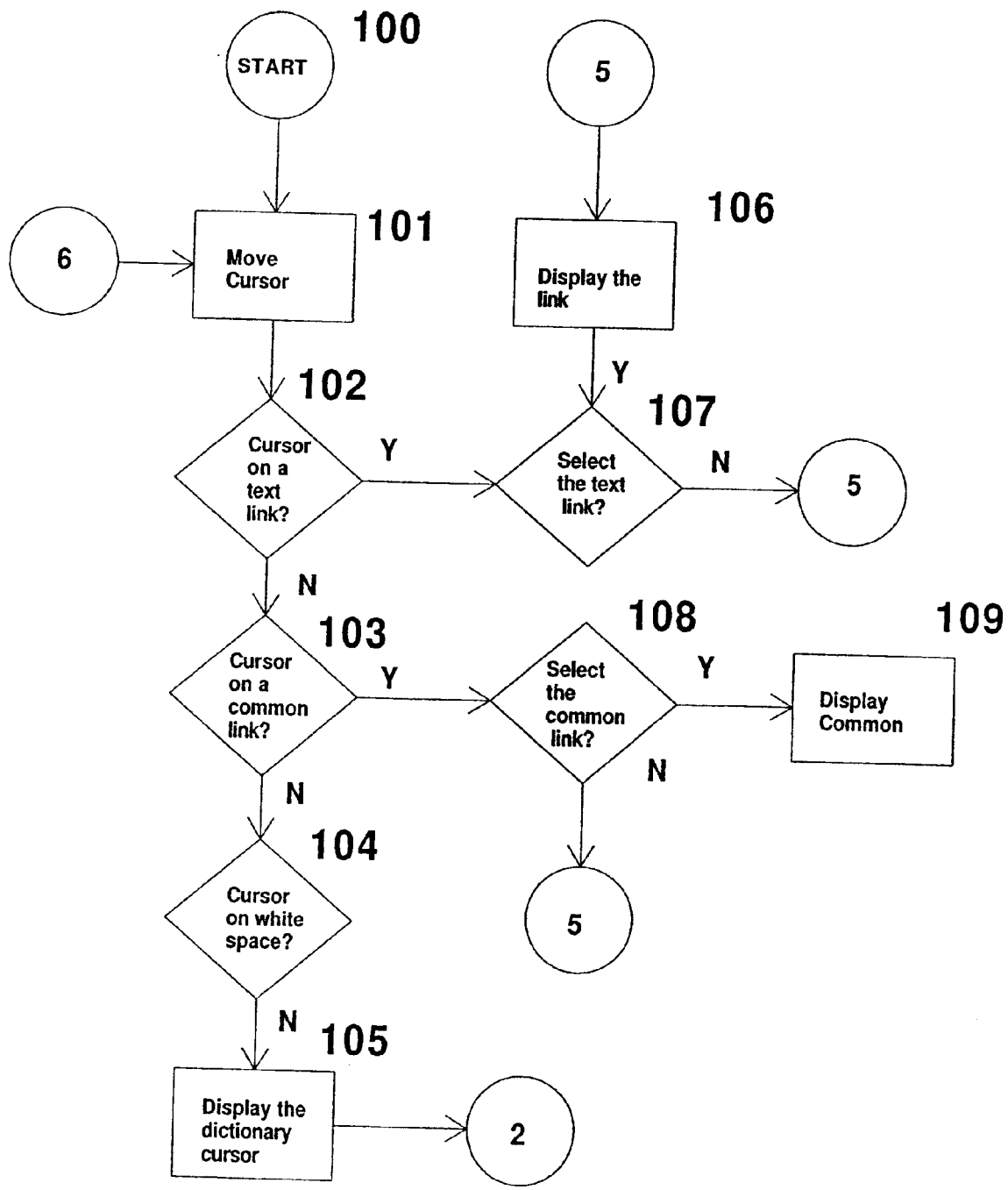
FIG. 1 is a flow diagram of showing the operation of a method according one embodiment of the invention.

The invention provides processes and systems which enable access to ancillary database information to enhance the viewing of a Web page while minimizing page clutter. The processes and systems of the invention indicate (preferably by change of pointer shape or other appearance attribute) the availability of an information retrieval function to the user where a screen pointer is over text data. The processes and systems of the invention determine (either automatically or on user request) the existence of links between ancillary databases and parsed text, indicate the existence of links to the viewer and provide viewer access to the database information.

The invention also encompasses computer-readable media for carrying out the methods of the invention wherein the computer-readable media contains information and/or programming which can be read and acted on by one or more computers to carry out the methods of the invention.

The invention encompasses methods for accessing data from a database file at a client computer in response to information viewed on the client computer from an intranet or internet source. In one embodiment, the method comprises:

a) on a client computer screen, accessing a source page from an internet or intranet server, b) pointing to a screen position on the accessed page using a pointer means, the pointer means being capable of changing appearance mode on the client computer screen, c) parsing the accessed page at the pointer position to determine whether the pointer is over a link location and whether the pointer position is over text data or unlinked white space, d) altering the appearance mode of the pointer means in response to the determination of step c), where the pointer is determined to be over text data in step c), the pointer means indicating the availability of a data retrieval function, e) receiving input requesting activation of the data retrieval function, f) providing at least one database in a computer readable storage device, the database(s) containing (i) at least one string-searchable field or (ii) at least one string index file linking text strings to information contained in the database, g) in response to the input of step e), parsing the text data to determine a parsed text value, comparing the parsed text value to values contained in the database(s) to determine the existence of relevant information in the database(s), and h) communicating on the client computer information selected from the group consisting of (i) a menu of selectable available relevant information selections from the database(s) determined in step g), (ii) relevant information from the database(s), or (iii) a combination of (i) and (ii).

The appearance modes of the pointer means preferably differ in shape. Where the information retrieval function of the invention can be invoked, shape preferably is suggestive of an information retrieval function. See for example the icons of FIG. 4(a). In an alternative embodiment of the invention, the availability of the information retrieval function may be indicated by an alteration of appearance in the frame of the Web browser window as displayed on the client computer.

In an alternative embodiment, the application of the invention can be limited to unlinked text only. In such instance, the determination in step c) of whether the pointer was over text or white space would be avoided in linked areas and the default browser behavior for hypertext links would hold. This embodiment is described in the discussion of FIGS. 1–3 below.

In further alternative embodiment, the indication of the availability of the information retrieval function can be performed after comparing the parsed text value with the database or index file information. In this embodiment, the availability of the information retrieval function would be indicated only if there were actual relevant information available in the database(s).

The relevant information is preferably communicated at the client computer by displaying text information from said database on the screen and/or by transmitting an audio/visual signal corresponding to the relevant information. The method of the invention may involve a plurality of databases. The components of the database may be stored in the same storage device or may be located in different storage devices. The database(s) or components thereof may be stored in temporary storage during the method of the invention to enhance performance speed.

The methods of the invention may be carried out on one or more computing devices in addition to a client computer. Thus, the comparison operation or other steps of the method may be performed on a server computer(s) which communicates the results to the user through the client computer.

Where a menu is displayed based on the results of the comparison operation the methods of the invention may further include steps of receiving a user input requesting one or more selections from the menu and of communicating corresponding information from the database(s) on the client computer.

Figure 4B:
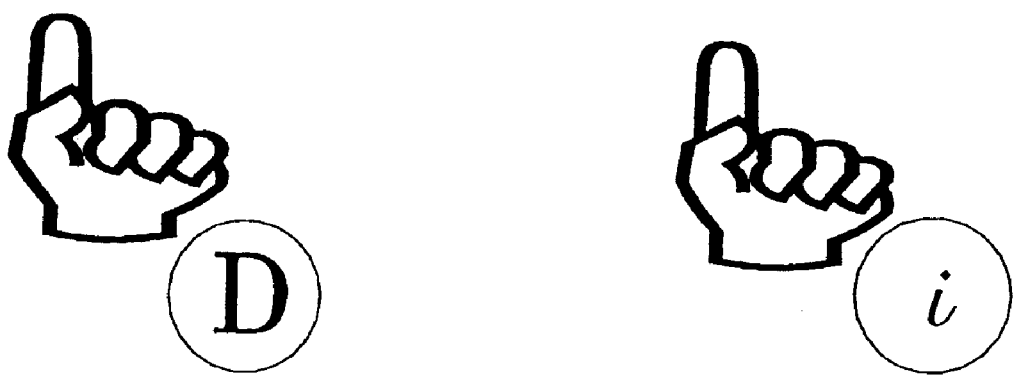
FIG. 4(b) indicates examples of pointer shapes useful for indicating availability of the information retrieval function of the invention for linked text.
Figure 4A:
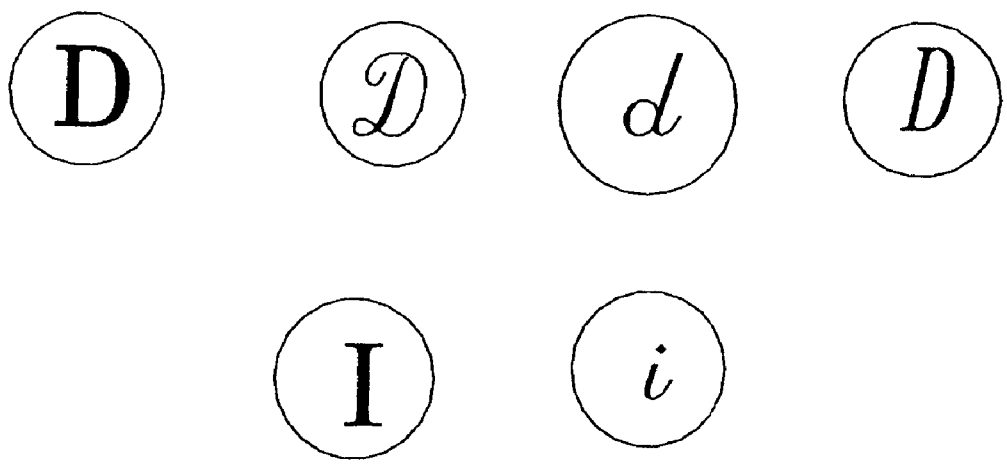
FIG. 4(a) indicates examples of pointer shapes useful for indicating availability of the information retrieval function of the invention for unlinked text.

In the embodiments of the invention where text located in a hyperlinked region of the Web page (e.g., a section of text bounded by HTML link tags) is compared to the provided database(s), the access to the information retrieval function is preferably provided using an alternative input such as a right (alternate) click mouse event. In such instance, the invention may involve modification of right click menu options to indicate the availability of the information retrieval option of the invention. The appearance of the pointer would preferably then be a combination of the default pointer for linked space with an indicator of the availability the information retrieval function such as shown in FIG. 4(b).

The database(s) used in the methods of the invention is preferably a dictionary, thesaurus, catalog or other information source.

The invention further encompasses a system carrying out the method of the invention for accessing data from a database file at a client computer in response to information viewed on the client computer from an intranet or internet source, the system comprising:

a) a client computer having (i) a view screen, (ii) a pointer means, the pointer means being capable of changing appearance mode on the client computer view screen, and means for displaying Web pages on the view screen, b) a source of internet Web pages, intranet Web pages, or both, the source being accessible by the client computer, c) a first parsing means for parsing a Web page displayed on the view screen at a pointer position on the screen to determine whether the pointer position is over a link location and whether the pointer is over white space or text data, d) means for altering the appearance mode of the pointer where the pointer is determined to be over text data in step c), the pointer means indicating the availability of a data retrieval function, e) means for receiving input requesting activation of the data retrieval function, f) a computer-readable storage device containing at least one database, the database(s) containing (i) at least one string-searchable field or (ii) at least one string index file linking text strings to information contained in an information file of the database, g) a second parsing means for parsing text data in a Web page on the view screen to determine a parsed text value, h) means for comparing the parsed text value from the second parsing means to values contained in the database(s) to determine the existence of relevant information in the database(s), and i) means for generating the relevant information from the database(s) and communicating on the client computer information selected from the group consisting of (i) a menu of selectable available relevant information selections from the database(s) based on output from the comparing means, (ii) relevant information from the database(s), or (iii) a combination of (i) and (ii).

The system of the invention may comprise a server computer wherein the computer-readable storage device is readable by the server computer. The system may comprise a plurality of databases stored on computer-readable media. The comparing means may located on a server computer. The database(s) may be a dictionary, thesaurus, catalog or other information source. If desired, the system may include several computers in communication whereby the desired functions and their results can be appropriately communicated. The specific database(s) accessed by the system may be preset by the Web page designer (e.g., as a Java (or other executable code) applet sent to the browser), may be a preset feature of the browser, or may be determinable by the user (e.g., as a progammable menu or option feature of the browser program).

The client computer preferably contains a means such as a Web browser program which operates on HTML code from the Web page source file(s) to communicate audio, visual and/or text information on the client computer screen (i.e., on the portion of the screen whose appearance is controlled by the operation of the browser program.) The functional computer code needed to carry out the methods of the invention and to enable operation of the systems of the invention may reside in computer-readable media on the client computer and/or on other computers such as Web proxy servers, database servers, etc. The computer code may be in the form of a disc, diskette or other portable computer-readable storage device.

A specific embodiment of the invention is described below for purposes of further illustrating a mode of operation for the methods and systems of the invention. The invention is not limited to the specific details of the embodiment.

The discussion below refers to analyzing the position of the pointer/cursor relative to the Web page. It should be understood that where the Web browser has a scroll bar function, the position of the pointer/cursor may retain its absolute location on the client computer view screen while changing its location on the scrolled Web page displayed on the view screen.

Figure 3:
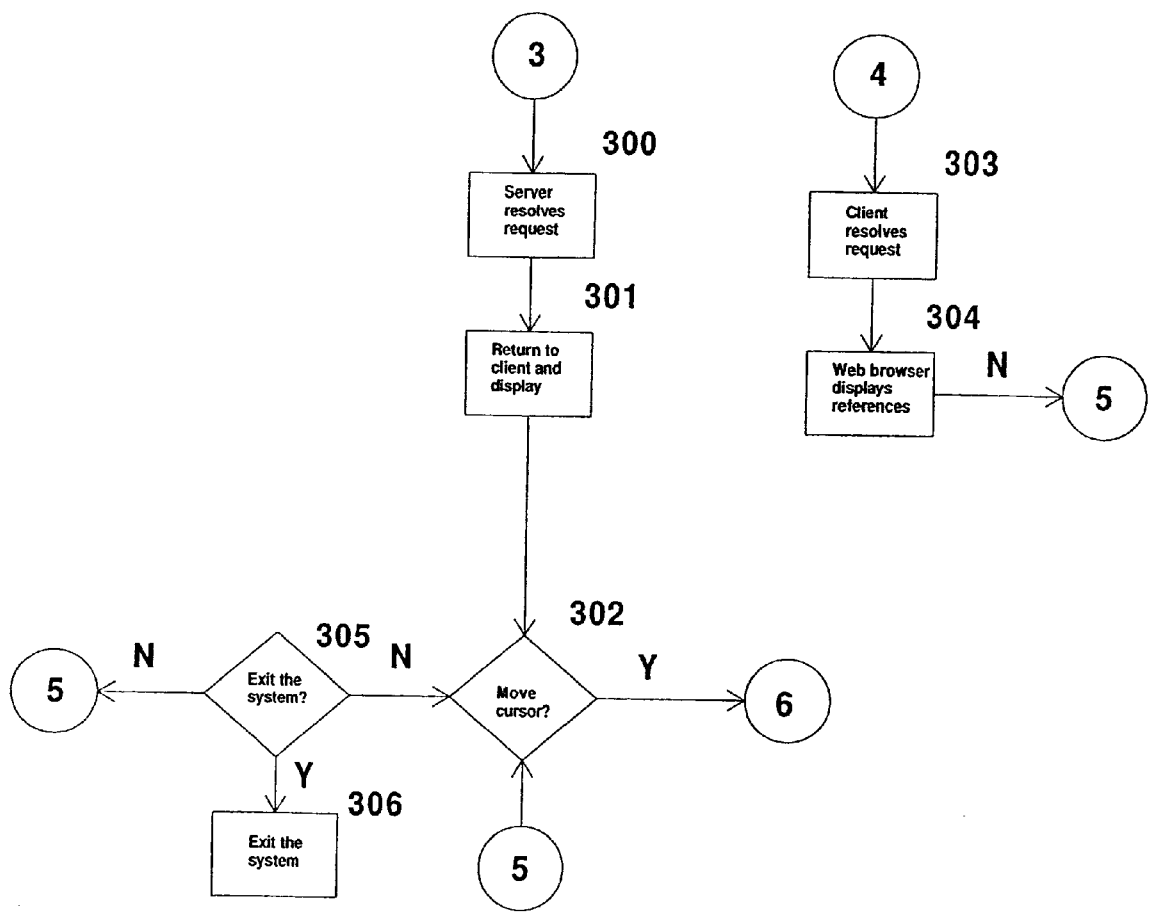
FIG. 3 is a flow diagram of further subprocesses of the operation described in FIG. 1.

Referring to FIG. 1, at start 100, a Web page (preferably from a file containing HTML source code or other browser-supported source code) is displayed on the screen of the client computer in an area of the screen whose appearance is controlled by a browser program. The pointer cursor movement relative to the Web page 101 occurs (typically by end-user input or by action of an HTML jump command acted on by the browser program). The position of the pointer/cursor is analyzed 102 to determine whether the pointer is over a text link (i.e. a link to a Web file containing text for display). The position of the pointer/cursor may be further analyzed 103 to determine whether the pointer is over a common link (i.e. a link to a Web file containing audio, video, graphics, Java code applets, etc.).

Where the user selects the text link at 107 or the common link at 108, the Web browser would simply execute the link at 106 or 109 in FIG. 1 and go to point 5 in the process to check for a change in the pointer/cursor position (see FIG. 3). Similarly, where the pointer/cursor resides on a link which is not selected, the system would also go to process point 5 to check for (or await) a change in the pointer/cursor position.

The pointer/cursor position would then be analyzed at 104 to determine whether the pointer/cursor was over a white space (i.e., an area of the screen that does not contain text data, graphics, or selectable links). Where the pointer/cursor is over white space, the system would go to process point 5 and check for a further change in screen position. Where the pointer/cursor is not over white space or a selectable link, a specialized pointer/cursor shape 105 would be displayed indicating the availability of the information retrieval function. Preferably, the cursor is of a suggestive shape such as the letter "i" or "d" in a circle such as shown in FIG. 4. It should be understood that the comparisons 102, 103, and 104 may be performed simultaneously or in a different order from the order indicated in FIG. 1. Where the cursor is over text data, the process would then proceed to process point 2 shown in FIG. 2.

Figure 2:
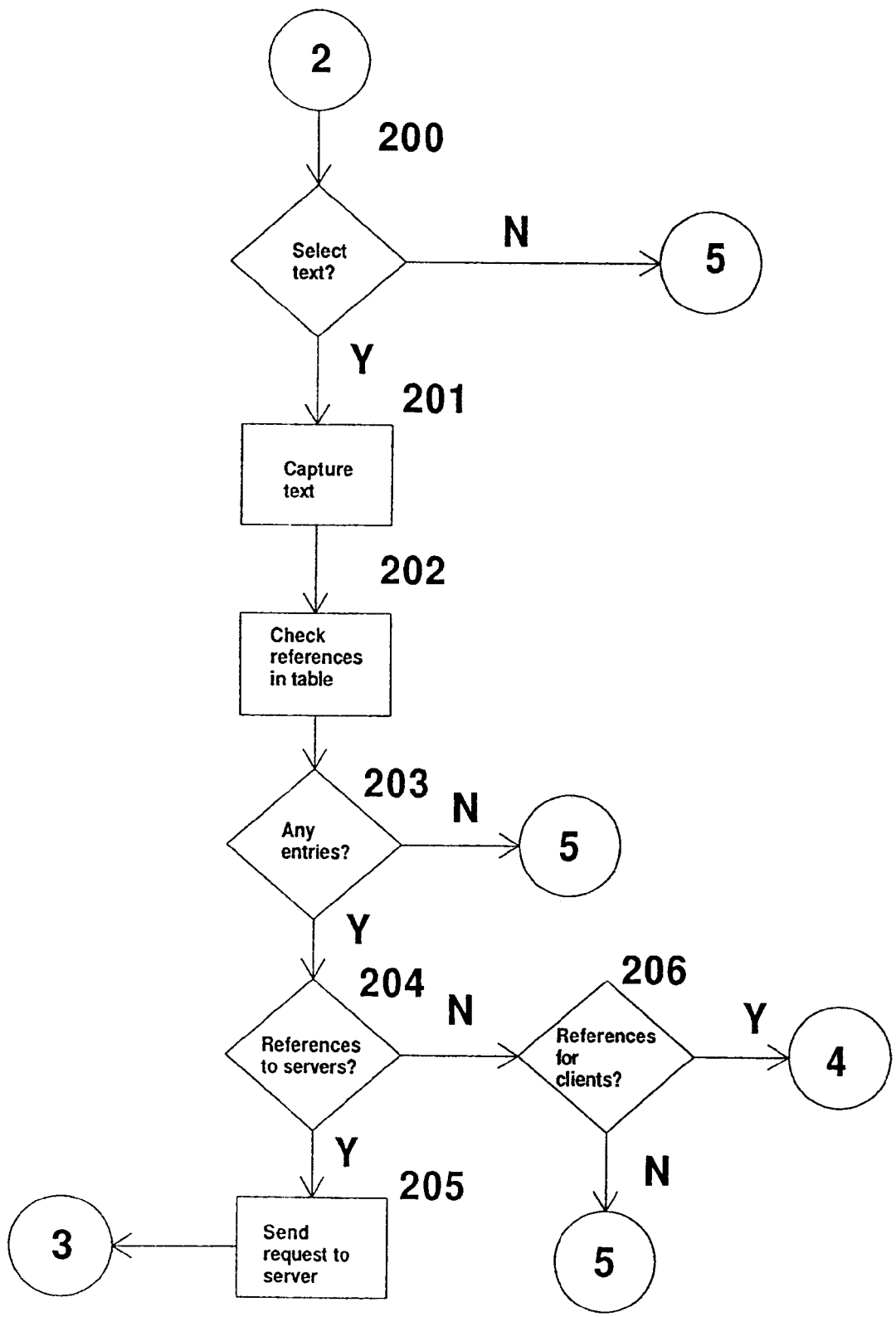
FIG. 2 is a flow diagram of a subprocess of the operation described in FIG. 1.

In FIG. 2, at 200, the process would check for an input by the user indicating a desire to invoke the information retrieval function. Such selection input may be in the form of a mouse event (e.g., left click, right click, etc.), keyboard entry, an audio input (e.g., where the client computer has voice recognition capability), etc. Where no input is made, the process goes to point 5 awaiting or checking for futher movement of the cursor on the Web page. Where the information retrieval function is invoked by the user, the text at the cursor position is captured (e.g., using conventional parsing techniques) to identify a word or string value from the Web page text at the cursor position.

The captured text or string value is then compared 202 to information in the database(s) provided. The comparison may be performed with various database structures. For example, where the database is simply a text file, the comparison may be a string search of the database for the captured text value. Alternatively, the database may consist of a multifield table (e.g. a spreadsheet), linked tables or files (e.g., a relational database), or a combination of index files and data files, etc. The databases or portions thereof may be located on the client computer or may be located on one or more servers in direct or indirect communication with the client computer. The comparison (or query) operation(s) may be performed at any of these computers as may be desired. In general, operations performed at the client computer may provide more end user flexibility, but may be slow or impossible where the database(s) are unwieldy.

Where the comparison operations indicate no occurrences of the captured text (or information relevant to the captured text) in the database(s) at 203, the process returns to process point 5. While not illustrated in the Figures, it may be desirable to communicate a message at the client computer indicating the absence of information in the databases before returning to process point 5. It may also be possible to present the user with an option to extend the search to other databases at this point in the process before returning to process point 5.

Where the comparison operations 202 indicate the presence of relevant database information, the location of the database references is then preferably determined 204/206 and appropriate requests for information are made to the server(s) 205 (process point 3 in FIG. 3) or client computer 303 (process point 4 in FIG. 3). If desired, the determinations 204/206 may be preceeded by a communication (not shown) indicating the availability of relevant information and asking whether the user wishes the information to be retrieved. Where multiple references are found in the comparisons 202, the communication of availability may be in the form of a menu providing the user an opportunity to select from among the multiple references prior to be retrieved and communicated to the user.

Depending on the location of the relevant database information, the server computer(s) 300 and/or the client computer 303 resolve the requests for the database information. The server would communicate 301 the requested information to the client computer which would then display or otherwise communicate the information to the user at the client computer. Where the database information is located on the client computer, the client computer would directly handle the display/communication function 304. Preferably, the communication of information to the user is done through a Web browser program resident on the client computer. Alternatively, the other appropriate programs on the client computer may be invoked to communicate the information. Once the information has been communicated to the user at the client computer, the process would continue to check the cursor position 302. If a position movement is detected relative to the display of the Web page, the process of analyzing the cursor location relative to the Web page is repeated (process point 6 in FIGS. 1 and 3). Otherwise, the process preferably checks 305 for a request to exit the process 306.

The invention is especially suitable for accessing dictionary or other databases containing text-driven explanatory information, however, it may also be used to retrieve audio/visual information (e.g., a .wav file giving the pronunciation of the word, or a jpeg file giving an illustration of the word).

What is claimed is:

1. A method for accessing data from a database file at a client computer in response to information viewed on the client computer from an intranet or internet source, the method comprising:

a) on a client computer screen, accessing a source page from an internet or intranet server,
b) pointing to a position on the accessed page using a pointer means,
c) parsing the accessed page at the pointer position to determine whether the pointer over a link location and whether the pointer is over white space or text data,
d) altering appearance of the pointer means or a portion of the screen perpheral to the accessed page in response to the determination of step c), where the pointer is determined to be over text data in step c), the altered appearance indicating the availability of a data retrieval function,
e) receiving input requesting activation of the data retrieval function,
f) providing at least one database in a computer readable storage device, the database(s) containing (i) at least one string-searchable field or (ii) at least one string index file linking text strings to information contained in an information file of the database,
g) in response to the input of step e), parsing the text data to determine a parsed text value, comparing the parsed text value to values contained in the database(s) to determine the existence of relevant information in the database(s), and
h) communicating on the client computer information selected from the group consisting of (i) a menu of selectable available relevant information selections from the database(s) determined in step g), (ii) relevant information from the database(s), or (iii) a combination of (i) and (ii).

2. The method of claim 1 wherein said communicating of step h) comprises displaying text information from said database.

3. The method of claim 1 wherein said communicating of step h) comprises transmitting an audio/visual signal corresponding to the contained information.

4. The method of claim 1 wherein a plurality of databases is provided in step f).

5. The method of claim 1 wherein the alteration of appearance in step d) comprises changing pointer shape.

6. The method of claim 1 wherein said database(s) is stored on a server and said comparing of step g) is done on said server.

7. The method of claim 4 wherein step h) comprises communicating on the client computer a menu of selectable available relevant information selections from the database (s) determined in step g).

8. The method of claim 7 further comprising:
i) receiving an input requesting a selection from said menu, and
j) communicating on said client computer information from at least one of said databases corresponding to the input request of step i).

9. The method of claim 1 wherein said database is provided on said client computer and the comparison of step g) is performed on said client computer.

10. The method of claim 1 wherein at least one string index file is provided in step f).

11. The method of claim 1 further comprising performing steps d)–h) only where the determination of step c) is that the pointer is over unlinked text data.

12. A system for accessing data from a database file at a client computer in response to information viewed on the client computer from an intranet or internet source, the system comprising:

a) a client computer having (i) a view screen, (ii) a pointer means, (iii) a means for displaying Web pages on said view screen, and (iv) means for changing appearance of the pointer means on said view screen or of a peripheral portion of the view screen about a displayed Web page,
b) a source of internet Web pages, intranet Web pages, or both, the source being accessible by the client computer,
c) a first parsing means for parsing a Web page displayed on the view screen at a pointer position on the screen to determine whether the pointer position is over a link location and whether the pointer is over while space or text data,
d) means for actuating the appearance changing means where (i) the pointer is determined to be over text data in step c), or (ii) where a comparing means indicates existence of relevant data in a provided database, the change of appearance indicating the availability of a data retrieval function,
e) means for receiving input requesting activation of the data retrieval function,
f) a computer-readable storage device containing at least one database, the database(s) containing (i) at least one string-searchable field or (ii) at least one string index file linking text strings to information contained in an information file of the database,
g) a second parsing means for parsing text data in a Web page on the view screen to determine a parsed text value,
h) means for comparing the parsed text value from the second parsing means to values contained in the database(s) to determine the existence of relevant information in the database(s), and
i) means for generating the relevant information from the database(s) and communicating on the client computer information selected from the group consisting of (i) a menu of selectable available relevant information selections from the database(s) based on output from the comparing means, (ii) relevant information from the database(s), or (iii) a combination of (i) and (ii).

13. The system of claim 12 further comprising a server computer wherein said computer-readable storage device is readable by said server computer.

14. The system of claim 12 comprising a plurality of databases stored on computer-readable media.

15. The system of claim 13 wherein said comparing means is located on said server computer.

16. The method of claim 1 wherein said database is a dictionary containing text definitions of words.

17. The system of claim 12 wherein said database is a dictionary containing text definitions of words.

18. A computer-readable medium encoded with executable instructions that can cause a client computer to perform functions comprising:
a) on a client computer screen, accessing a source page from an internet or intranet server,
b) parsing the accessed page at a pointer position to determine whether the pointer over a link location and whether the pointer is over white space or text data,
c) altering appearance of the pointer means or a portion of the screen perpheral to the accessed page in response to the determination of step b), where the pointer is determined to be over text data in step b), the altered appearance indicating the availability of a data retrieval function, d) receiving input requesting activation of the data retrieval function, e) providing at least one database in a computer readable storage device, the database(s) containing (i) at least one string-searchable field or (ii) at least one string index file linking text strings to information contained in an information file of the database, f) in response to the input of step e), parsing the text data to determine a parsed text value, comparing the parsed text value to values contained in the database(s) to determine the existence of relevant information in the database(s), and g) communicating on the client computer information selected from the group consisting of (i) a menu of selectable available relevant information selections from the database(s) determined in step g), (ii) relevant information from the database(s), or (iii) a combination of (i) and (ii).

19. A method for accessing data from a database file at a client computer in response to information viewed on the client computer from an intranet or internet source, the method comprising:

a) on a client computer screen, accessing a source page from an internet or intranet server, b) pointing to a position on the accessed page using a pointer means, c) parsing the accessed page at the pointer position to determine whether the pointer over a link location and whether the pointer is over white space or text data, d) providing at least one database in a computer readable storage device, the database(s) containing (i) at least one string-searchable field or (ii) at least one string index file linking text strings to information contained in an information file of the database, e) in response to the determination of step c), where the pointer is determined to be over text data in step c), parsing the text data to determine a parsed text value, comparing the parsed text value to values contained in the database(s) to determine the existence of relevant information in the database(s), and f) altering appearance of the pointer means or a portion of the screen perpheral to the accessed page in response to a determination of step e) that relevant information exists in said database(s), the altered appearance indicating the availability of a data retrieval function, g) receiving input requesting activation of the data retrieval function, h) communicating on the client computer information selected from the group consisting of (i) a menu of selectable available relevant information selections from the database(s) determined in step g), (ii) relevant information from the database(s), or (iii) a combination of (i) and (ii).

* * * * *